United States Patent
Popovic et al.

(10) Patent No.: US 7,187,765 B2
(45) Date of Patent: Mar. 6, 2007

(54) METHOD OF CAPTURING CONSTANT ECHO PATH INFORMATION IN A FULL DUPLEX SPEAKERPHONE USING DEFAULT COEFFICIENTS

(75) Inventors: Mirjana Popovic, Ottawa (CA); Xin Xu, Ottawa (CA)

(73) Assignee: Mitel Knowledge Corporation, Ottawa (CA)

( * ) Notice: Subject to any disclaimer, the term of this patent is extended or adjusted under 35 U.S.C. 154(b) by 152 days.

(21) Appl. No.: 10/722,472

(22) Filed: Nov. 28, 2003

(65) Prior Publication Data

US 2004/0125944 A1    Jul. 1, 2004

(30) Foreign Application Priority Data

Nov. 29, 2002   (GB) ................................. 0227885.1

(51) Int. Cl.
*H04B 3/23*    (2006.01)

(52) U.S. Cl. ........................... 379/406.08; 379/390.02; 370/286

(58) Field of Classification Search . 379/406.08–406.1
See application file for complete search history.

(56) References Cited

U.S. PATENT DOCUMENTS 5,631,900 A    5/1997  McCaslin et al.
6,163,609 A *  12/2000 Makinen et al. ....... 379/406.08
6,219,418 B1*  4/2001  Eriksson et al. ....... 379/406.08
6,266,409 B1   7/2001  Laberteaux et al.
6,865,270 B1*  3/2005  Troxel ................... 379/406.02

FOREIGN PATENT DOCUMENTS

| CA | 2 291 428 | 6/2000 |
| EP | 1 093 284 A2 | 4/2001 |
| GB | 2 344 500 A | 2/1998 |

* cited by examiner

*Primary Examiner*—Daniel Swerdlow
(74) *Attorney, Agent, or Firm*—Antonelli, Terry, Stout and Kraus, LLP.

(57) ABSTRACT

A method of determining when to save default coefficients in an echo canceller so as to ensure that the capture of coefficients that correspond to the best possible echo cancellation in a current condition. Coefficients are saved at varying times depending on the amount of echo removed by the echo canceller. More particularly, the present method involves constantly monitoring the error signal to the echo canceller and comparing it with the error signal that would be obtained if default coefficients were to be used instead of the current coefficients. This ensures that the default coefficients are upgraded each time the current set of coefficients is better than the saved default coefficients.

4 Claims, 3 Drawing Sheets

METHOD OF CAPTURING CONSTANT ECHO PATH INFORMATION IN A FULL DUPLEX SPEAKERPHONE USING DEFAULT COEFFICIENTS

FIELD OF THE INVENTION

The present invention relates in general to speakerphones and more particularly to a method of capturing constant echo path information in a full duplex handsfree (FDHD) speakerphone.

BACKGROUND OF THE INVENTION

One of the most important performance indicators for full duplex speakerphones is convergence time (i.e. the time required by the echo cancellers within the speakerphone to reach an acceptable level of cancellation). The convergence time of the speakerphone depends both on internal Line Echo Canceller (LEC) and Acoustic Echo Canceller (AEC) convergence times. In order to converge quickly and properly, a speakerphone echo canceller requires a reference signal with correct stochastic properties. At the beginning of a call (Start-up), the reference signal is usually not sufficiently stochastic (e.g. the line signal typically comprises narrow band tones such as dial tone) or speech is not present, so that echo cancellation is unable to commence immediately. In such situations the speakerphone loop may remain unstable for a noticeable period of time. This can result in feedback or "howling" of the speakerphone during start-up, especially when the speaker volume is high.

In order to prevent such feedback, it is an objective of speakerphone design to ensure that the echo cancellers (LEC and AEC) converge rapidly to the correct echo path models at start-up. Otherwise, the speaker volumes must be reduced during start-up, which may be annoying to a user.

According to one prior art approach to reducing the problem of feedback during speakerphone start-up, howling detection has been used (see ITU-T Recommendation G.168) in combination with gain control. According to this approach, the speaker volume (or loop gain) is reduced when howling is detected. A drawback of this approach is that the gain switching is often audible which may be annoying to the user.

Another prior art solution involves operating the speakerphone in a half duplex mode on start-up in order to prevent howling and echo from interfering with communication. The speakerphone remains in the half-duplex mode until the LEC adapts sufficiently to ensure echo cancellation. A drawback of this approach is that the speakerphone sometimes stays in the half-duplex mode for a long time, making communication between telephone parties difficult or impossible.

Yet another prior art solution involves forcing the speakerphone to start operation at a predetermined "acceptable" low volume level which guarantees stability in the audio loop, and then gradually increasing the volume as convergence of the echo canceller is achieved. A drawback of this approach is that the volume adjustment is often noticeable to the user.

Since the LEC models a network echo path where the first echo reflection of the near end hybrid is usually reasonably constant for each connection, and the AEC models an acoustic echo path where direct acoustic coupling or coupling through the plastic housing of the phone is always the same for a given phone, both the LEC and AEC maybe loaded initially with previously captured and saved constant echo path models represented by default coefficients, and then continue to converge toward the complete echo channel models. This results in faster convergence time, and more stability as the main, strongest echo reflections will already be cancelled using the default coefficient models.

Thus, according to copending Patent Canadian Patent Application No. 2,291,428, a method is provided for improving the start-up convergence time of the LEC filter, thereby resulting in a total reduced convergence time for the speakerphone. This method is based oil capturing the LEC coefficients once the LEC has converged, and saving them as the default coefficients for the next call. As a result, the echo-canceling algorithm does not have to wait for a suitable reference signal to commence convergence. At start-up, the echo canceller immediately begins canceling the line echo, based on the previously stored LEC coefficients, thereby assisting the AEC algorithm by eliminating residual line echo from the acoustic signal which the AEC algorithm is required to converge to, and initially making the speakerphone loop more stable. As indicated above, the same principal may also be applied to the AEC for direct acoustic coupling or coupling through the speakerphone housing plastic, which is always the same for a given phone. The default coefficients in this case represent the constant acoustic echo path from loudspeaker to microphone and may be reused for each new call. At start-up, the AEC immediately starts canceling the echo caused by direct acoustic coupling, while converging toward the complete acoustic echo path model that represents the combination of direct coupling and the specific room echo response.

The principle of saving default coefficients may also be applied to multiple loudspeaker-to-microphone echo paths for multiple-microphone directional systems, or even loudspeaker-to-beam echo paths for beamforming-based systems that perform echo cancellation on the output signal of a beamformer. In these cases, default coefficients can be reused from one instance to the next in each different direction (e.g. angular sectors).

In order for such systems to work properly, the coefficients must be saved at appropriate times. If they are saved at arbitrary instants (e.g. at the end of a call), then there is a risk that the full-duplex echo cancellation algorithm will not be in a well-converged state at the instant of saving the coefficients, For example, the echo cancellation algorithm may be in the process of adapting to an echo path change related to the user moving his/her hand towards the telephone to press a button for ending the call. Saving the default coefficients in this case and reusing them at a later stage (e.g. for the next call) may result in poor echo canceller performance until it re-converges to a set of "good" coefficients.

As indicated above, the system set forth in Canadian Patent Application No. 2,291,428 tracks the degree of convergence of the full-duplex algorithm, and saves the default coefficients each time the convergence reaches a predetermined level. In one embodiment, the amount of echo actually cancelled by the algorithm is measured, and the coefficients are saved each time this amount increases by 3 dB from the previous save. One problem with this method is that if the full-duplex algorithm is subjected to narrow-band signals (e.g. in-band tones that are not detected fast enough), then it may reach excellent levels of convergence with coefficients that are very different from the useful wide-band echo-path coefficients. In such situations the system may never reach as good a level of convergence again with a wider-band signal, such that proper coefficients are never captured. This may result in annoying echo bursts for the far-end user each time these coefficients are used (for instance, at the beginning of each subsequent call). Another problem is that if the telephone is moved to a different location on a desk, where the direct echo path is more difficult to adapt to, then it may never be able to capture coefficients corresponding to its new location. It may therefore constantly reuse coefficients that do not correspond to those characterizing the real echo path, resulting in mediocre echo cancellation until the algorithm has a chance to re-converge to the real echo path.

SUMMARY OF THE INVENTION

According to the present invention, a method is provided for determining when to save coefficients so as to ensure that the system always captures coefficients that correspond to the best possible echo cancellation in its current condition, and to recover from scenarios where 'bad' default coefficients are captured Thus, the saving of coefficients occurs at varying times depending on the amount of echo removed by the echo canceller. More particularly, the inventive method involves constantly monitoring the error signal to the echo canceller and comparing it with the error signal that would be obtained if default coefficients were to be used instead of the current coefficients. This ensures that the default coefficients are upgraded each time the current set of coefficients is better than the saved default coefficients.

BRIEF DESCRIPTION OF THE DRAWINGS

A detailed description of the prior art and of a preferred embodiment of the invention is provided herein below with reference to the following drawings, in which.

DETAILED DESCRIPTION OF PRIOR ART AND PREFERRED EMBODIMENT

As discussed briefly above, a speakerphone echo canceller comprises two adaptive filters which attempt to converge to two different echo models (acoustic and network echo) at the same time. As a result, speakerphones can easily become unstable, especially during start-up.

Figure 1:
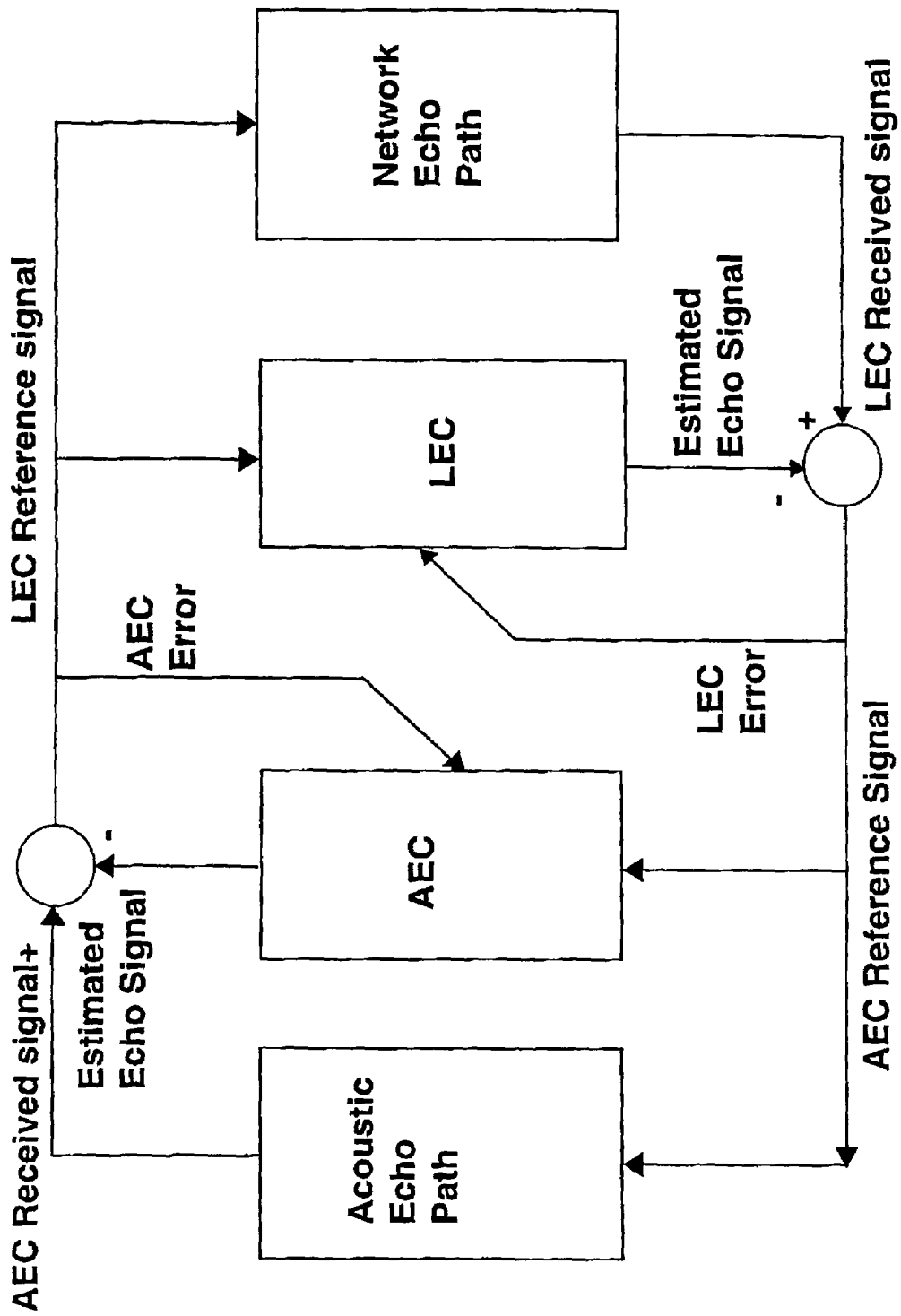
FIG. 1 is a block diagram of a prior art speakerphone echo canceller structure.

A traditional speakerphone echo canceller is shown in FIG. 1, wherein essential speakerphone components which are not related to echo cancellation have been omitted for clarity (e.g. double talk detector, non-linear processor, etc.) and are not addressed herein since they are not germane to the invention. The echo canceller attempts to model the transfer function of the echo path by means of an LEC filter and an AEC filter. The received signal (line or acoustic) is applied to the input of each filter (LEC and AEC) and to the associated echo path (network or acoustic) such that the estimated echo can be canceled by simply subtracting the signal which passes through each echo canceller from the received signal. If the transfer function of the model of the echo path is exactly the same as the transfer function of the echo path, the echo signal component is completely canceled (i.e. the error signal will be zero). The error signal is used for adaptation, so that the echo canceller converges to the correct transfer function, as discussed briefly above.

Typically, an algorithm such as the NLMS (Normalized-Least-Mean-Squared) algorithm is used to approximate the echo path (see "C261 (UNC) DSP Re-engineering and Performance Report" Mitel Semiconductor, Document No. C261AP13, Oct. 21, 1996).

From FIG. 1 it will be appreciated that the residual echo after imperfect cancellation by the LEC will pass to the AEC reference signal. Since this residual echo is not correlated to the AEC received signal, this can cause the AEC filter to diverge. The extent to which AEC filter diverges depends on the level of the residual line echo. If the line echo is sufficiently canceled, its effect on the AEC behavior will be negligible.

Echo Return Loss Enhancement (ERLE) is an indicator of the amount of echo removed by an echo canceller. The ERLE is defined as:

ERLE(dB)=10 $\log_{10}$[Power(ReceivedSignal)/Power (ErrorSignal)];

A generally acceptable LEC convergence time requires that the echo canceller achieve 27 dB of ERLE in 0.5 sec (in ideal conditions).

Since the telephone is always connected to the same local loop (i.e. to the near-end Central Office (CO) or PBX), the impedance of the local loop remains the same for each call and consequently the near-end echoes remain fairly constant, from call to call. Accordingly, the local loop echo coefficients can be stored and re-used from call to call, thereby improving the start-up ERLE of the LEC, Furthermore, since the direct acoustic coupling through the plastic from loudspeaker to microphone is constant for given phone, the coefficients representing this part of the acoustic echo path can also be stored and re-used from call to call, thereby improving the startup ERLE of the AEC.

Figure 2:
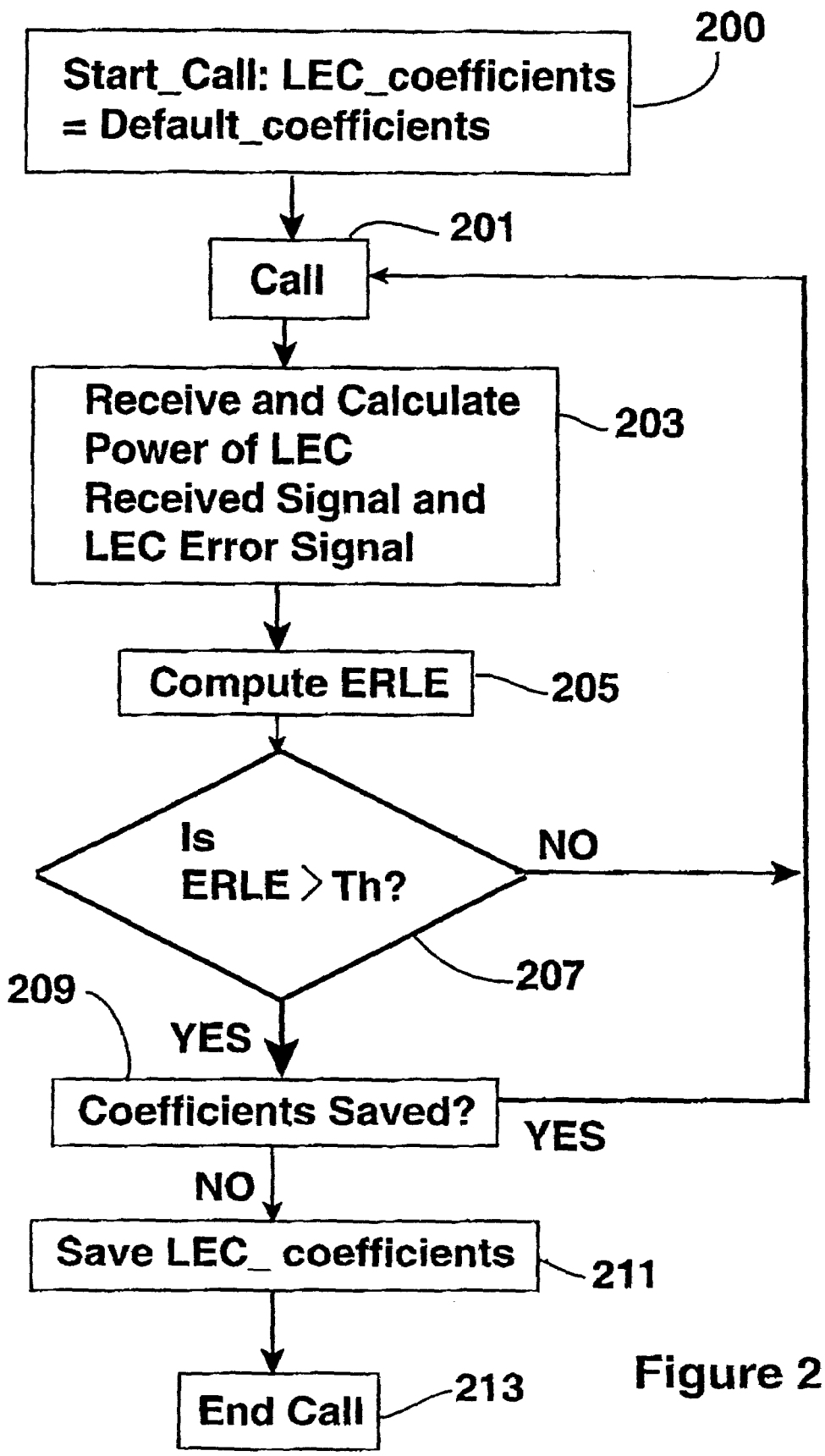
FIG. 2 is a flow chart showing the steps of the echo cancellation method according to Applicant's own prior art.

Thus, with reference to the flowchart of FIG. 2, which shows operation of the method set forth in Canadian Patent Application No. 2,291,428, after start-up of the echo canceller (Step 200), any previously stored default LEC coefficients are loaded into the LEC. Although Canadian Patent Application No. 2,291,428 refers only to default coefficients being saved for the LEC, as indicated above the same principles apply to the AEC coefficients. Thus, the LEC (and/or AEC) begin(s) convergence using the well known NLMS algorithm (or other). On initial power-up of the speakerphone (i.e. prior to placing the first call), the initial coefficients are zero. Thus, the first call after power-up will always be a "training" call that results in capturing a suitable set of default coefficients for future calls. Next, at step 201, the "Call" proceeds. Signal levels of the LEC (and/or AEC) received signal and error signal are detected (step 203) and the ERLE is calculated using the formula set forth above (step 205). When a predetermined ERLE threshold level (Th) is reached (e.g. at least 24 dB of echo is canceled), as calculated at step 207, and provided that the best LEC (and/or AEC) coefficients have not been previously saved during the call-in-progress (step 209), then the LEC (and/or AEC) coefficients of the (near) constant echo path are saved (step 211). Convergence of the LEC (and/or AEC) then proceeds as per usual and the call is completed (step 213). Once saved, the default coefficients are not recalculated again for the duration of the call (i.e. a YES decision at step 209). However, the LEC (and/or AEC) default coefficients will be calculated once per each call to ensure the best default set is captured for the next call.

At start-up of the next call, the previously stored LEC (and/or AEC) coefficients are retrieved and used as the default coefficient set for the LEC (and/or AEC) (step 200), instead of starting from zero.

The following pseudo code illustrates the principles of the above method in greater detail, wherein "EC" is used to indicate both the LEC and AEC:

```
Power-up: Default_coefficients = [000...0];
Start_Call: EC_coefficients = Default_coefficients;
    Call:
        Execute EC algorithm;
            Calculate power level of received signal;
            Calculate power level of error signal;
            If (ERLE > Threshold) AND (Best default set not saved)
                Save near echo coefficients
        If Not(End of the Call) Go to Call;
        If New Call Go to Start_Call;
```

Thus, each call subsequent to the initial power-up "training" call is provided with default coefficients that model the network and acoustic echo paths and guarantee small LEC and AEC error. This improves the raining and tracking characteristic of the Full Duplex Handsfree Speakerphone (FDHF) and eliminates feedback during start-up. The best results are achieved when the training call uses a handset since there is no AEC-LEC loop instability and the LEC and AEC can therefore converge quickly.

Figure 3:
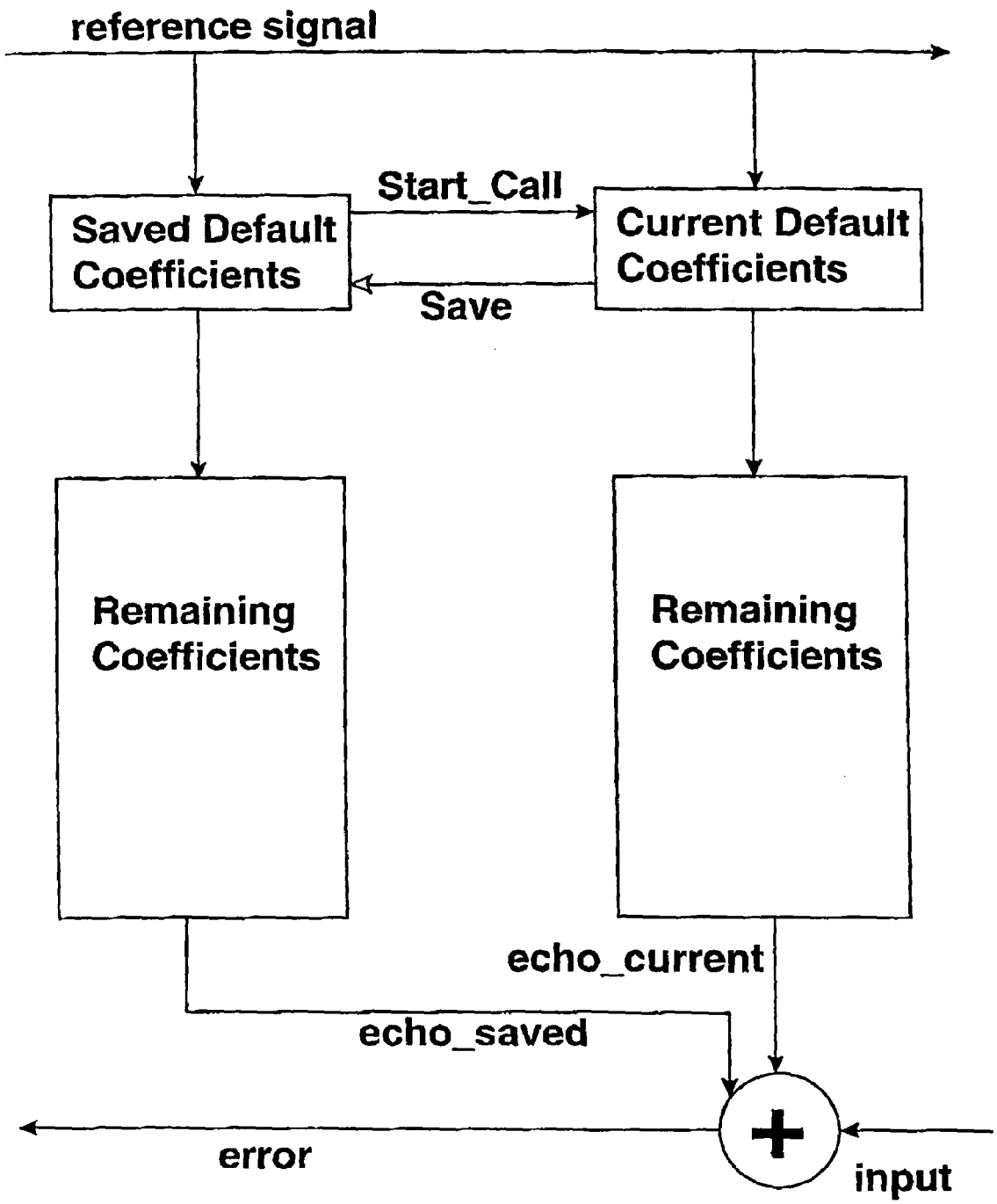
FIG. 3 is a block diagram showing an adaptive filter structure for implementing a method of triggering capture of coefficients according to the present invention.

According to the present inventions and in contrast with Applicant's prior method as set forth in Canadian Patent Application No. 2,291,428, instead of fixing the threshold ERLE at a value of 24 dB, the coefficients are captured and saved whenever there is an improvement in ERLE over a constantly increasing threshold value. In addition to this, the present invention constantly controls whether the saved set of the default coefficients is still valid. As shown in FIG. 3, this is accomplished by continuously monitoring the error signal output from the subtractor (i.e. input signal—echo_current output from echo canceller) and comparing it to the error signal that would be obtained based on the default set of coefficients (i.e. input signal—echo_saved, depicted in FIG. 3 using stippled lines). If the monitored error signal is less than that calculated using the default set of coefficients, then the current set of coefficients are saved as the new default set.

The following pseudo-code sets forth the method of the present invention in greater detail:

```
System Initialization: Default_coefficients=zeros;
Start_Call: EC_coefficients = Default_coefficients;
    Call:
        Execute EC adaptation algorithm;
        Calculate error = input signal - echo_current;
        Calculate power level of received signal (Es);
        Calculate power level of error signal (Ee);
        Calculate ERLE as function of (Ee/Es);
        If (ERLE > Threshold)
Save:       Save Default_coefficients
            Threshold=Threshold+ERLE_thr;/*Increase the ERLE
            requirement by ERLE_thr dB*/
        End If
Check is executed HERE.
    If Not(End of the Call) Go to Call;
    If New Call Go to Start_Call;
```

The foregoing is similar to the "Call" method set forth above with reference to FIG. 2. The following "Check" algorithm ensures that the saved default coefficients are correct, according to the method of the present invention:

```
Check:
    Calculate error_saved = input signal-echo_saved; /*Calculate
        error_saved using saved    */
                                    /*default coefficients and rest of   */
                                    /*coefficients in EC filter;         */
    Calculate power level of error_saved signal (Ec_saved);
    If (Ec < Ec_saved/Error_thr)       /* Current coefficients are
        better than saved by Error_thr dB*/
    {
        Counter++;
        If (Counter == Time_threshold)
        {
            Counter =0;
            Save Default_coefficients;
        }
    }
    Else
    {
        Counter = Counter - DecThr; OR Counter=0;
    }
```

Thus, with each executions of the "Save" algorithm, the threshold is incremented until it reaches its maximum value for a given speakerphone. Then, the "Check" algorithm is used to correct or overwrite the default coefficients in the event that they have been incorrectly determined using the "Save" algorithm (e.g. due to narrow band training signal, phone being moved to a different location, etc.) Setting the $ERLE\_thr$ to be the same value as $Error\_thr$, ensures that the "Save" algorithm results in saving the default coefficients while incrementing the threshold, and the "Check" algorithm re-saves the default coefficients only if the previously saved coefficients are no longer correct. In other words, the "Save" algorithm captures default coefficients whereas the "Check" algorithm verifies the saved coefficients.

According to the preferred embodiment, $ERLE\_{thr}=6$ dB, $Error\_thr=6$ dB, and $Time\_threshold=2400$ samples or 30 ms.

Other embodiments and applications of the invention are possible. For example, this algorithm with some variations may also be implemented for the AEC filter to capture the acoustic feedback through the plastic, which will be constant for the specific phone design. All such variations and modifications are believed to be within the sphere and scope of the invention as set forth in the claims appended hereto.

We claim:

1. A method of updating of a set of default coefficients used for quick convergence of an echo canceller, wherein said echo canceller receives a reference signal and converges to an estimated echo signal of an input signal according to a current set of filter coefficients via subtracting said estimated echo signal from said input signal to create a current error signal for output from said echo canceller and feedback of said current error signal, said method including:

applying said default coefficients to said echo canceller for generating a further echo signal;

subtracting said further echo signal from said input signal to generate a further error signal; and comparing said current error signal with said further error signal and in the event said further error signal exceeds said current error signal by a threshold amount then replacing said set of default coefficients by said current set of filter coefficients.

2. The method of claim 1, wherein said threshold amount is 6 dB.

3. A method of updating of a set of default coefficients used for quick convergence of an echo canceller, wherein said echo canceller receives a reference signal and converges to an estimated echo signal of an input signal according to a current set of filter coefficients via feedback of a current error signal, said method including:
  (a) applying said default coefficients to said echo canceller for generating a further echo signal:
  (b) subtracting said further echo signal from said input signal to generate a further error signal; and
  (c) comparing said current error signal with said further error signal and in the event said further error signal exceeds said current error signal by a threshold amount then replacing said set of default coefficients by said current set of filter coefficients; and wherein
  said set of default coefficients is replaced by said current set of filter coefficients only if said further error signal continuously exceeds said current error signal by said threshold amount for at least 300 ms.

4. The method of claim 3, wherein said threshold amount is 6 dB.

* * * * *